(12) United States Patent  (10) Patent No.: US 8,726,896 B2
Guillory et al.  (45) Date of Patent: May 20, 2014

(54) BARBECUE GRILL HAVING A SPLIT LID

(76) Inventors: Morris Guillory, Chicago, IL (US);
Jenette Guillory, Chicago, IL (US)

( * ) Notice: Subject to any disclaimer, the term of this patent is extended or adjusted under 35 U.S.C. 154(b) by 1241 days.

(21) Appl. No.: 12/245,879

(22) Filed: Oct. 6, 2008

(65) Prior Publication Data

US 2010/0083947 A1  Apr. 8, 2010

(51) Int. Cl.
*A47J 37/07* (2006.01)
*F24B 1/02* (2006.01)
*F24B 1/18* (2006.01)
*F24B 1/192* (2006.01)

(52) U.S. Cl.
USPC .... 126/25 R; 126/37 B; 126/39 B; 126/39 R; 126/41 R; 126/37 R; 99/450

(58) Field of Classification Search
USPC ....... 126/25 R, 37 B, 39 B, 39 R, 41 R, 37 R, 126/190; 99/450, 482, 449
See application file for complete search history.

(56) References Cited

U.S. PATENT DOCUMENTS

| | | | | |
|---|---|---|---|---|
| 145,491 A * | 12/1873 | Dibble | .......................... | 126/25 R |
| 266,661 A * | 10/1882 | Tracy | ............................ | 126/506 |
| 754,557 A * | 3/1904 | Greene | ....................... | 126/25 R |
| 2,143,602 A * | 1/1939 | Johnson | ...................... | 126/25 R |
| 2,666,426 A * | 1/1954 | Pollard | ....................... | 126/25 R |
| 2,742,892 A * | 4/1956 | Herzer | ........................... | 126/502 |
| 2,790,380 A * | 4/1957 | Shryack | .......................... | 99/331 |
| 2,902,026 A * | 9/1959 | Hathorn, Jr. | ................. | 126/25 R |
| 2,909,170 A * | 10/1959 | Hathorn, Jr. | ................. | 126/25 R |
| 2,985,164 A * | 5/1961 | Imoto | .......................... | 126/25 R |
| 3,013,549 A * | 12/1961 | Sexton, Jr. | ................... | 126/25 R |
| 3,306,280 A * | 2/1967 | Vannoy | .......................... | 126/25 R |
| 3,533,393 A * | 10/1970 | Haapanen | .................... | 126/25 R |
| 3,683,791 A * | 8/1972 | Rast, Jr. | .......................... | 99/340 |
| 3,699,876 A * | 10/1972 | Ellis | .............................. | 99/396 |
| 3,769,901 A * | 11/1973 | Phillips | .......................... | 99/444 |
| 3,868,942 A * | 3/1975 | Lewis | .......................... | 126/25 R |
| 3,880,139 A * | 4/1975 | Young | .......................... | 126/9 R |
| 4,076,008 A * | 2/1978 | Deaton | ....................... | 126/25 R |
| 4,418,678 A * | 12/1983 | Erickson | ....................... | 126/9 R |
| 4,665,891 A * | 5/1987 | Nemec et al. | ................ | 126/25 R |
| H813 H * | 9/1990 | Ragon | ............................. | 99/467 |
| 5,163,358 A * | 11/1992 | Hanagan et al. | ................ | 99/339 |
| 5,163,359 A * | 11/1992 | McLane, Sr. | ................... | 99/447 |
| 5,165,384 A * | 11/1992 | Knutson | ....................... | 126/25 C |
| 5,184,599 A * | 2/1993 | Stuart | .......................... | 126/25 R |
| 5,253,634 A * | 10/1993 | LeBeouf | ....................... | 126/25 A |
| 5,481,964 A * | 1/1996 | Kitten | ............................. | 99/339 |
| 5,588,420 A * | 12/1996 | Dickson | ....................... | 126/25 R |
| 5,711,209 A * | 1/1998 | Guines | ............................. | 99/339 |
| 5,755,151 A * | 5/1998 | Nowicke, Sr. | .................. | 99/340 |
| 5,947,013 A * | 9/1999 | Stewart, Jr. | .................... | 99/446 |
| 6,012,381 A * | 1/2000 | Hawn | .............................. | 99/340 |
| 6,125,836 A * | 10/2000 | Felton, Jr. | ................... | 126/25 R |
| 6,189,528 B1 * | 2/2001 | Oliver | .......................... | 126/25 R |
| 6,209,533 B1 * | 4/2001 | Ganard | ........................ | 126/25 R |

(Continued)

*Primary Examiner* — Kang Hu
*Assistant Examiner* — Daniel E Namay
(74) *Attorney, Agent, or Firm* — Blanchard & Associates

(57) ABSTRACT

A barbecue grill assembly comprises a firebox having a bottom and first and second ends, side walls extending from the first and second ends, and a pair of lids each hingeably connectable to an upper portion of one of the side walls and separately movable between open and closed positions. The pair of lids forms a cooking enclosure with the firebox when in their closed positions.

7 Claims, 2 Drawing Sheets

(56) References Cited

U.S. PATENT DOCUMENTS

| | | | |
|---|---|---|---|
| 6,336,397 B1 * | 1/2002 | Michel et al. | 99/427 |
| 6,422,134 B1 * | 7/2002 | Barksdale et al. | 99/340 |
| 6,557,544 B2 * | 5/2003 | Sim | 126/25 A |
| 6,557,545 B2 * | 5/2003 | Williams | 126/25 R |
| 6,622,715 B2 * | 9/2003 | Liu | 126/25 R |
| 6,626,089 B1 * | 9/2003 | Hubert | 99/339 |
| 6,681,759 B2 * | 1/2004 | Bentulan | 126/25 R |
| 7,159,509 B2 * | 1/2007 | Starkey | 99/339 |
| 7,296,564 B2 * | 11/2007 | Wilson | 126/25 R |
| 7,793,649 B2 * | 9/2010 | Barkhouse et al. | 126/39 G |
| 7,810,485 B2 * | 10/2010 | Messmer | 126/38 |
| 8,381,712 B1 * | 2/2013 | Simms, II | 126/25 R |
| 2001/0017131 A1 * | 8/2001 | Sim | 126/25 A |
| 2001/0035176 A1 * | 11/2001 | Bush, III | 126/25 R |
| 2002/0112717 A1 * | 8/2002 | Bentulan | 126/25 R |
| 2002/0179081 A1 * | 12/2002 | Holland et al. | 126/25 R |
| 2002/0189603 A1 * | 12/2002 | Hsu | 126/25 R |
| 2003/0024523 A1 * | 2/2003 | Ching-Hui | 126/25 R |
| 2005/0217659 A1 * | 10/2005 | McClenahan | 126/25 R |
| 2005/0217660 A1 * | 10/2005 | Wilson | 126/25 R |
| 2006/0016447 A1 * | 1/2006 | Meyer | 126/276 |
| 2006/0037599 A1 * | 2/2006 | Hill | 126/25 R |
| 2009/0165778 A1 * | 7/2009 | Harter et al. | 126/39 G |
| 2010/0024798 A1 * | 2/2010 | Sampson | 126/25 R |
| 2010/0078009 A1 * | 4/2010 | Davis et al. | 126/25 R |
| 2010/0282235 A1 * | 11/2010 | Lu | 126/25 R |
| 2011/0126820 A1 * | 6/2011 | Barkhouse et al. | 126/25 R |
| 2011/0146656 A1 * | 6/2011 | Paap et al. | 126/25 R |

* cited by examiner

US 8,726,896 B2

BARBECUE GRILL HAVING A SPLIT LID

FIELD

The invention relates, generally, to outdoor cooking devices and, more particularly, to a barbecue grill having a split lid that permits independent access to each of two separate cooking areas by movement of a corresponding half of the split lid.

BACKGROUND

Outdoor cooking devices, such as barbecue grills, are well known for their ability to provide naturally flavored food. Barbecue grills of many shapes and sizes have been known and used for many years. Typically, the barbecue grill is fueled by an open fire consisting of wood or coal wherein the food drippings help in the flavoring of the food. Alternatively the cooking device can be fueled by a gas burner.

As open fires present unsuitable risks for indoor use, cooking devices have been configured for controlling the open fires in the outdoor environment. In a typical construction, the conventional barbecue grill has an elevated, leg-supported housing with a top opening coverable with a removable lid. A charcoal or wood grate is removably supportable within a lower portion of the housing, and a food supporting grate is removably supportable within the housing adjacent its open upper end which snugly receives the lid.

Important components of proper outdoor cooking of food involve regulating the heat of the open fire as well as timing the length of food exposure to the heat. The use of the housing lid is most effective in controlling the heat of the open fire by limiting oxygen required for combustion purposes. A problem, quite familiar to backyard cooking enthusiasts, arises when it becomes time to lift the housing lid in order to turn and/or rearrange the cooking food items on the upper grate.

The housing lid is typically provided with one or more hinges attached to the rear of the grill so as to move between a closed position and an open position while facing the cook or operator. In order to open and close the lid, it is necessary for the cook to place his/her arm and hand directly over the upper grate, and thereby over the often intense rising heat from the burning fuel. Additionally, particularly when greasy food such as meats is being cooked, lifting the lid often causes "flame up" which can burn both the food and the cook.

An additional disadvantage of grills having lids hinged to the rear of the grill is the moment of inertia created about the grill itself by virtue of the cantilevered lid. This hinging arrangement can cause post-mounted grills to lean rearwardly from their anchoring point, and creates a potential imbalance for portable grills and a possibility of tipping.

Therefore, a need exists for a barbecue grill that eliminates or minimizes the above-mentioned problems, limitations and disadvantages commonly associated with conventional barbecue grills. These and other needs will become apparent to those of skill in the art after reading the present specification.

SUMMARY

The foregoing problems are solved and a technical advance is achieved by the present invention. Articles of manufacture consistent with the present invention provide a barbecue grill having a split lid.

A barbecue grill assembly comprises a firebox having a bottom and first and second ends, side walls extending from the first and second ends, and a pair of lids each hingeably connectable to an upper portion of one of the side walls and separately movable between open and closed positions. The pair of lids forms a cooking enclosure with the firebox when in their closed positions.

In one aspect, the barbecue grill comprises support legs secured or detachably affixed to said bottom of said firebox to support said firebox on a surface.

In one advantageous aspect, at least one of the pair of lids comprises a plurality of vent holes in the upper portion thereof, and a plate member slidably secured thereon to selectively cover one or more of the plurality of vent holes.

In another advantageous aspect, one of the pair of lids includes a lip that slidably covers a seam formed between the pair of lids when in their closed positions.

In another advantageous aspect, at least one side wall includes a vent hole formed at a lower portion thereof.

In another advantageous aspect, the grill comprises a smokestack mounted to one of the pair of lids at an upper position thereof that cooperates with the interior of said grill through an exhaust orifice formed in an upper portion thereof.

In another advantageous aspect, the barbecue grill comprises a separator detachably positioned at any location along a length of the firebox so as to create two separate cooking areas in the enclosure formed by the firebox and the pair of lids.

Other apparatus, devices, features, and advantages of the present invention will be or will become apparent to one with skill in the art upon examination of the following figures and detailed description. It is intended that all such additional apparatus, devices, features, and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention. In the drawings.

DETAILED DESCRIPTION OF THE DRAWINGS

Reference will now be made in detail to implementations consistent with the present invention as illustrated in the accompanying drawings. Wherever possible, the same reference numbers will be used throughout the drawings and the following description to refer to the same or like parts. As would be understood to one of ordinary skill in the art, certain components or elements for attachment of the wagon-car seat adapter to the wagon are not shown in the figures or specifically noted herein to avoid obscuring the invention.

Figure 1:
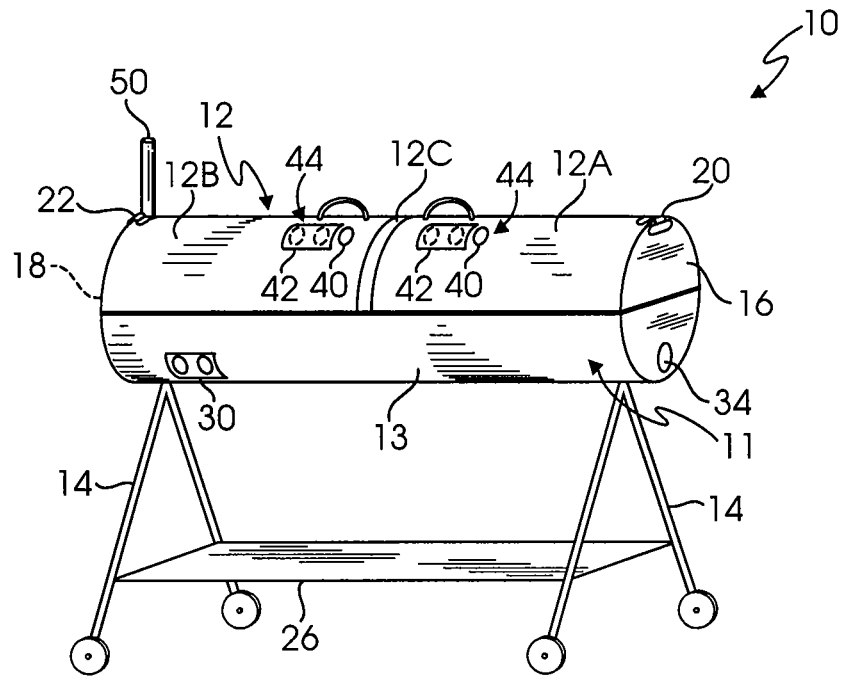
FIG. 1 is a perspective view of one embodiment of a barbecue grill with the split lid closed in accordance with the present invention.
Figure 2:
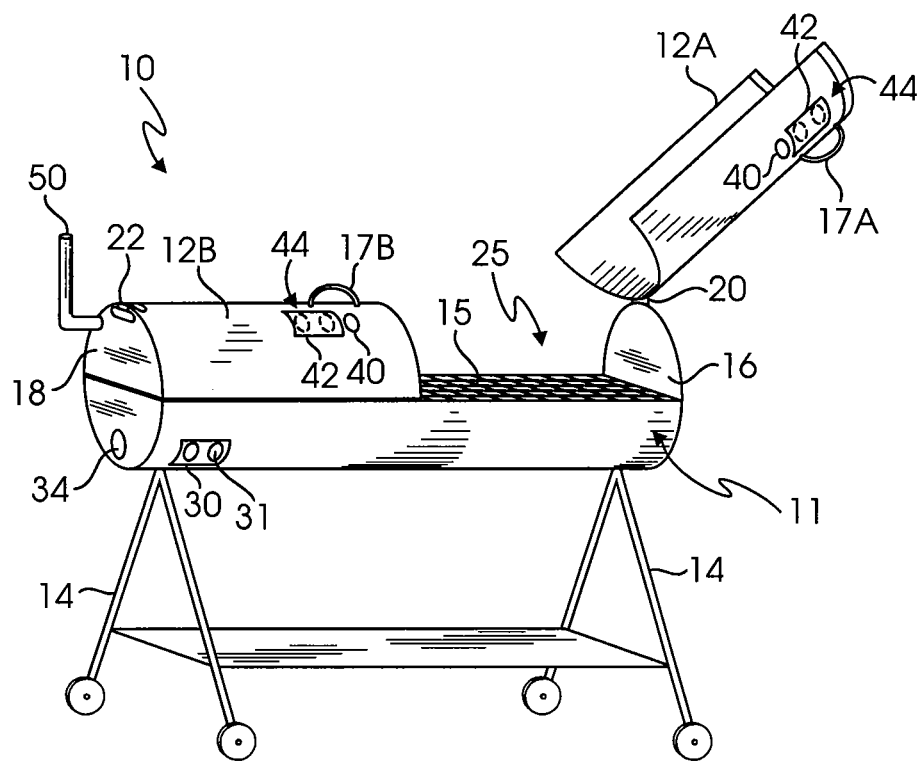
FIG. 2 is a perspective view of the barbecue grill of FIG. 1 with one half of the split lid in the open position.
Figure 3:
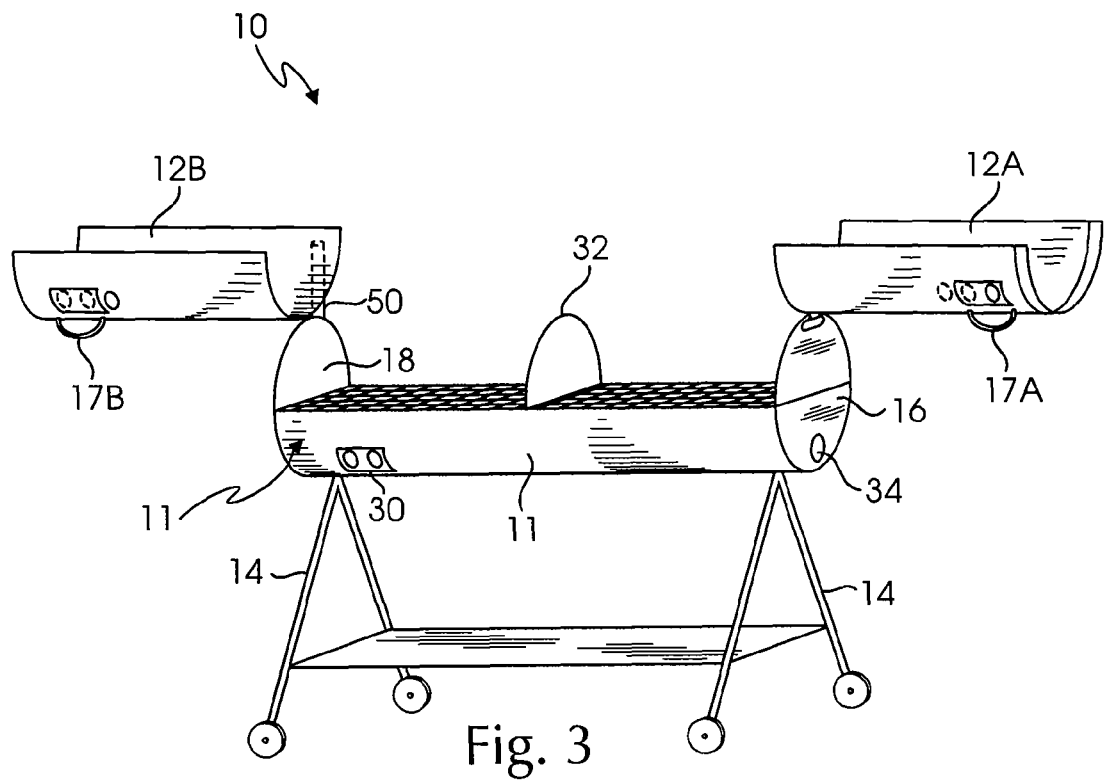
FIG. 3 is a is a perspective view of the barbecue grill of FIG. 1 with both halves of the split lid in the open position.

Referring to FIGS. 1-3, an embodiment of food cooking apparatus comprising a barbecue grill assembly 10, hereafter referred to as grill, is illustrated in accordance with the present invention. The grill 10 includes a firebox 11 and a split lid assembly 12, and support legs 14. The support legs 14 are secured or detachably affixed to a bottom end 13 of the firebox 11 to support the firebox 11 on a surface. In a preferred embodiment of the present invention, four support legs 14 are employed; however, any number of support legs 14 known to one of ordinary skill in the art may be used, including only one support leg 14. The four support legs 14 may also be equipped with wheels or rollers, so as to facilitate rolling or movement of the grill 10 on a multitude of surfaces. Moreover, each of four support legs 14 is affixed at a lower portion thereof to a shelf 26, as shown in FIGS. 1-3.

As shown, the grill 10 is formed from a cylindrical barrel that has been cut longitudinally to separately create the fire box 11, opposing side walls 16 extending upwardly from opposing longitudinal ends of firebox 11, and 18 and the split lid assembly 12. Alternately, the grill 10 may have any other shape, such as rectangular shape.

The split lid assembly 12, which is the longitudinal arc portion of the cylindrical barrel that complements the firebox 11, is cut circumferentially in half, or as desired, to form a pair of partial lids 12A and 12B. The partial lids 12A and 12B are each pivotally mounted on a corresponding side wall 16 or 18 via one or more hinges 20 and 22, or the like, that allow the lids to move between closed positions and open positions. The partial lids 12A and 12B permit independent access to each of two separate cooking areas by their respective movement.

As further illustrated in FIG. 2, the partial lid 12A includes one or more handles 17A for allowing the cook to lift sideways the partial lid 12A into an open position as shown in FIG. 2, and lower the partial lid 12A into a closed position as shown in FIG. 1. The handle 17A is shown positioned on an upper portion of the partial lid 12A and in proximity of the leftmost edge of the partial lid 12A near a circumferential seam 12C separating the two partial lids 12A and 12B when in their closed positions. Alternately, the handle 17A may be positioned on any portion of the partial lid 12A facing the cook, preferably at a portion that facilitates and minimizes the effort used in the opening and closing of the partial lid 12A.

Figure 4A:
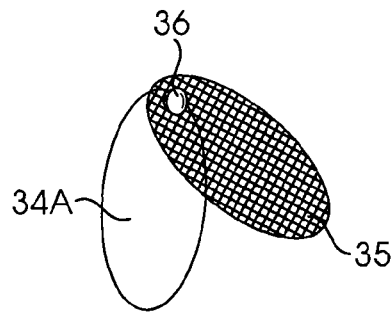
FIG. 4A-C illustrates perspective views of embodiments of side vents and their covers and a slidable lip that fits on the split lid in accordance with the present invention.
Figure 4B:
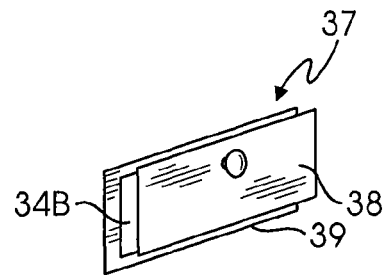
Figure 4C:
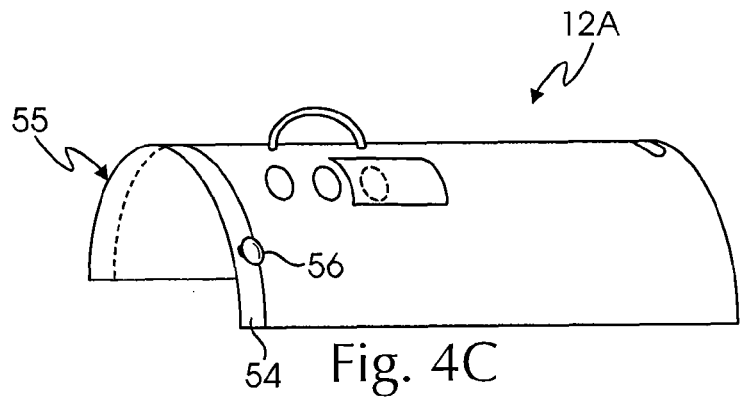

Referring to FIG. 4C, one of the partial lids 12A and 12B may include a lip or flange 55 that is slideably positioned over the whole circular end 54 opposite the other end that is hinged to the side wall 16 or 18. This slidable lip 55 is configured to cover the seam 12C when both of the partial lids 12A and 12B are in the closed positions so as to seal the seam 12C thereby minimizing the escape of heat during cooking. Moreover, a knob or button 56 is affixed to slidable lip 55 and is utilized by the user for moving slidable lip 55 sideways along the longitudinal direction of the associated partial lid 12A. Alternatively, knob 56 may be a handle, a protrusion, a hump, or the like.

The two partial lids 12A and 12B also preferably each include a stop assembly (not shown) for limiting their sideward travel with respect to the cooking surface. The stop assembly may preferably include a stop protrusion (not shown) extending outwardly from the upper portion of each of partial lids 12A and 12B in proximity of a corresponding hinge 20 or 22. The stop protrusion is configured to rest against or come into contact with one the sidewalls 16 and 18 when the corresponding partial lid 12A or 12B is in a full or maximum open position. The protrusion is preferably integrally formed with the respective partial lid 12A or 12B, for example, by being cast therewith of cast aluminum or other metals and alloys known to those of ordinary skill in the art. Alternatively, a flange may be integrally positioned at an upper portion of the sidewall 16 or 18 so as to support the partial lid 12A or 12B when rotated to a maximum open position, thereby precluding further rotation. Still further, each of the hinges 20 and 22 may be configured to include an integral stop that automatically limits the sideward travel of the respective partial lid 12A or 12B.

As shown in FIG. 2, the fire box 11, side walls 16 and 18, and the partial lids 12A and 12B define an interior 25 into which various food items may be placed for cooking or smoking. Access to the interior 25 is provided by openings formed in the upper portion of the fire box 11 by partial lids 12A and 12B. The fire box openings are enclosed by the partial lids 12A and 12B when in their respective closed position.

The firebox 11 has an essentially hollow interior adapted to receive charcoal or wood on a bottom surface and to support at least one rack or grate 15 at a plurality of heights above the bottom surface for placing the food to be cooked or smoked. Another grate (not shown) may be used to support the charcoal or wood above the bottom surface of the firebox 11. Alternately, a gas burner assembly (not shown) may be positioned below the grate 15 and gas tube or conduits (not shown) may extend from the gas burner assembly through the fire box 11. Additionally, control valves or buttons 31 may be integrally formed with or positioned on an aperture cover 30 positioned on the front side of the fire box 11.

As shown in FIGS. 2 and 3, each of sidewalk 16 and 18 may include a side vent or draft inlet 34 formed at a lower portion thereof. As shown in FIG. 4A, a cover or lid 35 may be configured to pivot about a securing fastener 36 so as to cover at least partially a circular side vent 34A, thereby controlling the flow of air into the firebox 11. The side vent 34 is shown to be circular but may be of any desirable shape. Alternately, each of sidewalk 16 and 18 may include a slide damper structure 37, shown in FIG. 4B, which includes an elongated rectangular slide damper element 38 slidably carried within opposed guide channels 39 over the rectangular side vent 34B.

As shown in FIG. 1, at least one partial lid 12A and 12B includes a plurality of aligned vent holes 40 in the upper portion thereof, and a plate member 42 slidably secured thereon. The slidable plate member 42 is configured to selectively cover one or more of the vent holes 40, as shown in FIG. 1. The slidable plate member 42 may further have a knob or handle 44 used for sliding it sideways by the user. Preferably, one vent hole 40 will remain at least partially open, and not closed by the plate member 42, at all times so as to avoid extinguishing the flame. The selected positioning of the plate member 42 with respect to the vent holes 40 allows the cook to control the internal temperature of the grill 10 when the partial lid 12A and 12B are in the closed position. Partially opening one of the partial lids 12A and 12B also allows the user to control the temperature inside the grill 10.

Alternately, the plurality of vent holes may be arranged along an arc in the upper portion thereof (not shown). A knob or handle (not shown) is secured to the top of the at least one of the partial lids 12A and 12B by a shaft extending through the corresponding lid. A plate member is secured to and rotatable around the shaft on the top of the corresponding lid so as to selectively cover one or more of the vent holes.

The grill 10 may include a closable opening (not shown) in the bottom surface of the firebox 11, which is preferably closed by a cover during cooking operations, used to facilitate the removal of ashes and other combustion remains.

As illustrated in FIG. 3, the grill 10 may also include a vertical separator 32 that can be detachably positioned at any location along the length of the firebox 11 so as to create two separate cooking areas. This separator 32 is useful when the amount of food to be cooked is not large enough to require the whole cooking surface of the grate 15. In addition, the separator 32 is especially useful to prevent commingling of flavors when disparate foods are cooked simultaneously.

In one embodiment, a smokestack 50 may be mounted to one of the side walls 16 or 18 at an upper position thereof that does not interfere with the opening and closing operations of the partial lids 12A and 12B. The smokestack 50 cooperates with the interior of the grill 10 through an exhaust orifice (not shown), which preferably is formed in an upper portion of the side wall 16 or 18. Alternately, the smokestack 50 may be mounted on the partial lids 12A and 12B and cooperating with the interior of the grill 10 through another exhaust orifice formed in an upper portion thereof.

When operated as a smoker, the side vent 34 that shares the same sidewall 16 or 18 as the smokestack 50 is closed, while the opposite side vent 34 is left at least partially open and charcoal or wood fire is preferably started at a position near the open side vent 34. During a food smoking operation, when air is drawn in through the open side vent 34, the so positioned smokestack 50 draws smoke across the length of the firebox 11, and then outwardly through its exhaust orifice. Thus, positioning the smokestack and its exhaust orifice at an upper end of the grill 10, such as the upper end of the side wall 16 or 18, beneficially provides for a more uniform flow of smoke across the various food items housed within the grill 10 during the smoking operation.

In addition, the grill 10 may be equipped with a lighting system (not shown) to enable the cook or user to selectively direct or orient light to any part or position of the grill 10 or the firebox 11, which is beneficial to the monitoring of food items being cooked during periods of diminished natural light. The lighting system may be formed of an electrical lamp positioned on a pole or a flexible conduit suitably affixed to the grill 10 and may be powered by electrical wires connected to a power source, batteries, solar cells, or the like.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

The invention claimed is:

1. A barbecue grill assembly comprising:
    a firebox having a bottom and first and second longitudinal ends;
    a grate removably supported within the firebox and providing a cooking surface;
    a pair of side walls, wherein each one of the pair of side walls extends from one of the first and second longitudinal ends, and extends vertically above the grate; and
    a pair of lids, wherein each one of the pair of lids is hingeably connected to an upper portion of the each one of the pair of side walls and separately movable between open and closed positions to provide access to and removal of cooking food items, wherein the pair of lids forms a cooking enclosure with the firebox and the pair of side walls when in their closed positions.

2. The barbecue grill according to claim 1, further comprising:
    support legs secured or detachably affixed to said bottom end of the firebox to support said firebox on a surface.

3. The barbecue grill according to claim 1, wherein at least one of the pair of lids comprises a plurality of vent holes in the upper portion thereof, and a plate member slideably secured thereon to selectively cover one or more of the plurality of vent holes.

4. The barbecue grill according to claim 1, wherein one of the pair of lids includes a lip that slideably covers a seam formed between the pair of lids when in their closed positions.

5. The barbecue grill according to claim 1, wherein at least one of the pair of side walls includes a vent hole formed at a lower portion thereof.

6. The barbecue grill according to claim 1, further comprising a smokestack mounted to one of the pair of lids or to one of the pair of side walls.

7. The barbecue grill according to claim 1, further comprising a separator detachably positioned at any location along a length of the grate so as to create two separate cooking areas in the enclosure formed by the firebox, the pair of side walls, and the pair of lids.

\* \* \* \* \*